US006976595B1

(12) United States Patent
Geller

(10) Patent No.: US 6,976,595 B1
(45) Date of Patent: Dec. 20, 2005

(54) RETRACTABLE SYSTEM FOR HANGING STORAGE

(75) Inventor: Marilyn Geller, 24 Monroe Pl., #10D, Brooklyn, NY (US) 11201

(73) Assignee: Marilyn Geller, New York, NY (US)

( * ) Notice: Subject to any disclaimer, the term of this patent is extended or adjusted under 35 U.S.C. 154(b) by 0 days.

(21) Appl. No.: 10/459,300

(22) Filed: Jun. 11, 2003

(51) Int. Cl.[7] .................................................. A47F 5/08

(52) U.S. Cl. ................. 211/94.01; 211/162; 211/85.29; 211/124

(58) Field of Search .......................... 211/94.03, 105.3, 211/162, 86.01, 123, 124, 105.1, 94.01, 85.3, 211/85.29; 248/200.1, 683, 690, 215, 205.3, 248/340; 24/303

(56) References Cited

U.S. PATENT DOCUMENTS

| | | | | | |
|---|---|---|---|---|---|
| 356,125 | A | * | 1/1887 | Hotzhalb | 211/85.3 |
| 1,132,190 | A | * | 3/1915 | Kohout | 211/85.3 |
| 1,415,316 | A | * | 5/1922 | Corbin | 211/85.3 |
| 2,917,185 | A | * | 12/1959 | Kovacs | 211/94.01 |
| 3,116,837 | A | * | 1/1964 | Kelly | 211/94.01 |
| 3,124,253 | A | * | 3/1964 | Petrich | 211/94.01 |
| 3,335,872 | A | * | 8/1967 | Dodich | 211/85.3 |
| 3,389,807 | A | * | 6/1968 | Manning et al. | 211/85.3 |
| 3,863,659 | A | * | 2/1975 | Gillis | 135/136 |
| 3,897,122 | A | * | 7/1975 | McEvers | 312/321 |
| 3,954,182 | A | * | 5/1976 | McEvers | 211/94.01 |
| D273,645 | S | * | 5/1984 | McEvers | D6/513 |
| 4,585,127 | A | * | 4/1986 | Benedict | 211/34 |
| 4,653,818 | A | * | 3/1987 | DeBruyn | 312/246 |
| 4,771,899 | A | * | 9/1988 | Benedict et al. | 211/60.1 |
| 4,805,783 | A | * | 2/1989 | Mayer | 211/94.01 |
| 4,869,379 | A | * | 9/1989 | Hawkrige | 211/100 |
| 4,907,706 | A | * | 3/1990 | Henderson | 211/46 |
| D334,291 | S | * | 3/1993 | Rooke | D6/317 |
| 5,191,984 | A | * | 3/1993 | Kon et al. | 211/115 |
| 5,590,940 | A | * | 1/1997 | Richard | 312/287 |
| 5,671,987 | A | | 9/1997 | Hommes | |
| 5,740,927 | A | * | 4/1998 | Yemini | 211/70.6 |
| 5,897,002 | A | * | 4/1999 | Carlino | 211/70.6 |
| 6,296,128 | B1 | * | 10/2001 | Isserstedt | 211/113 |
| 6,435,357 | B1 | * | 8/2002 | Lee | 211/70.6 |
| 6,484,893 | B1 | * | 11/2002 | Tkatch | 211/94.02 |
| 6,499,608 | B1 | * | 12/2002 | Sterling et al. | 211/70.6 |
| 6,679,392 | B1 | * | 1/2004 | Costa | 211/94.01 |
| 6,719,158 | B2 | * | 4/2004 | Goldberg | 211/123 |
| 2002/0144962 | A1 | * | 10/2002 | Dettorre et al. | 211/85.7 |

* cited by examiner

*Primary Examiner*—Jennifer E. Novosad

(57) ABSTRACT

A storage system that is attached by (means of)a bracket (FIG. 3) to the underside of a horizontal surface. This bracket (FIG. 3) incorporates a track made by the bracket side wall (32) and the bracket lip (34), which holds a retractable slide arm (FIG. 4) that slides forward when in use and slides back when at rest. A bracket stop (36) at the front end of the bracket (FIG. 3) prevents the slide arm (FIG. 4) from separating from the bracket (FIG. 3). The front end of the slide arm (FIG. 4) incorporates a slide arm pull (29) for ease of use. Items to be stored are suspended from hooks (30) that are positioned on the underside of the extended center section of the slide arm (28). Hangers (FIG. 9) incorporate a hanger eye (38) that slips easily on or off the hook (30). Hanger adhesive (44), which lines the hanger base (42), provides a (means) technique for attaching the hanger (FIG. 9) to the top of the receptacle to be stored.

1 Claim, 3 Drawing Sheets

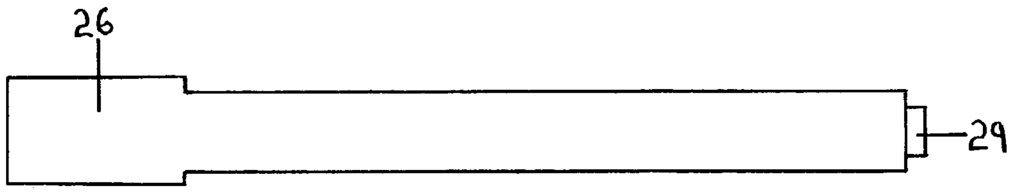
Fig. 5
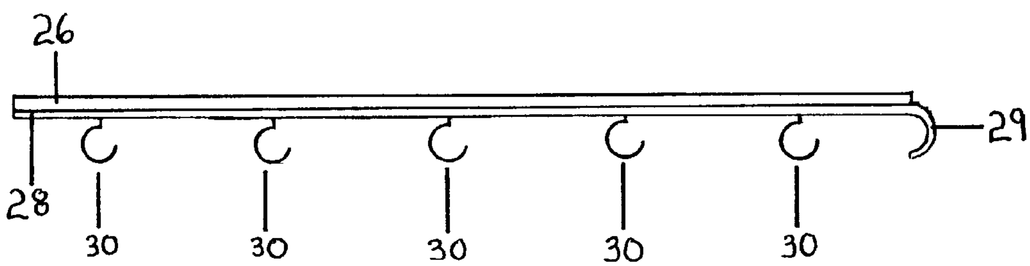
Fig. 6
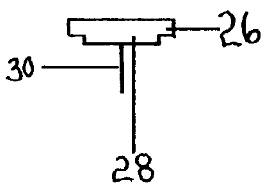
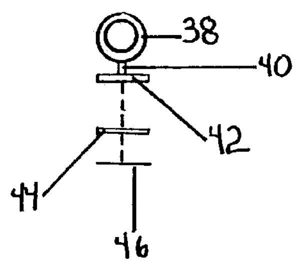
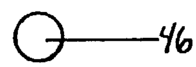
Fig. 7
Fig. 8
Fig. 9

RETRACTABLE SYSTEM FOR HANGING STORAGE

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF INVENTION

Field of the Invention

This invention relates to the storage and organization of items that can be hung from a hook; or contained in small jars, bottles, bags or other small receptacles and hung from a hook.

BACKGROUND OF THE INVENTION

Our physical environment is filled with many items that are difficult to store in a compact and organized fashion. Many of these items—such as spice jars and vitamin bottles—are sold packaged in containers. Others items—such as cake decorating tips and small hardware items such as nuts, washers, screws or nails—are not sold with any permanent housing. In either case, these items often end up crammed into cabinets or stuffed into draws in a disorganized and inefficient manner.

In terms of prior art, spice jar storage has received a great deal of attention. There are, for example, many available options for storing spices on racks or carousels. Typically, spice racks are either hung on walls or placed upon flat surfaces. Carousels are usually placed on flat surfaces or stored in cabinets. Nevertheless, a cabinet-stored carousel requires use of a large portion of the cabinet's interior space and, because of its round shape, renders the cabinet's corner space unusable.

A search of prior art did not disclose any patents that read directly on the claims of the instant invention. However, the following U.S. patents are considered related:

U.S. Pat. No. 5,671,987 to Hommes (1997) discloses a retractable cabinet rack specifically designed to solve the problem of visibly storing and retrieving small containers. However, the ability to store containers of various heights is limited by the fixed dimensions of the bin used for placement of containers.

U.S. Pat. No. 4,653,818 to DeBruyn (1987) discloses a retractable apparatus for organizing storage containers in a cabinet. However, items to be stored using this mechanism must be decanted into the storage bins which fit into the mechanism. Thus, each bin may offer too little or too much space for the particular item. In the case of offering too little space for transferring an item from its store package to the organizer's container, the organizer does not fully solve the storage problem. In the case of too much space to store an item, the efficiency of the organizer is reduced.

U.S. Pat. No. 6,499,608 to Sterling et al. (2002) discloses a wall-mounted storage system. This system, in addition to other options, offers hooks as a method of storage. However, the storage system is not retractable. Thus, it does not provide the aspect of using space efficiently in a closed cupboard or deep shelving.

BACKGROUND OF INVENTION

Objects and Advantages

Several objects and advantages of the present invention of a retractable system for hanging storage are:

a) To provide a storage system that is suspended from the underside of a horizontal surface thereby allowing use of space otherwise frequently wasted in a cabinet or shelving unit.

b) To provide a storage system that is retractable when not in use but extends forward from the underside of the horizontal surface during use to allow ease of access to items stored in the back of the storage system unit.

c) To provide storage for receptacles or items of various heights and widths.

d) To provide the option for as much or as little storage as is required by using a single or several storage system units installed side by side.

e) To provide hooks to allow for suspension of items to be stored.

f) To provide storage of any receptacle or item that can be hung from a hook.

g) To provide hangers to attach to the tops of receptacles—such as spice and vitamin jars—that are suitable for suspension from the storage system unit, but do not have an existing means of suspension.

SUMMARY

In accordance with the present invention, the retractable system for hanging storage provides a flexible system for storing items that are difficult to store and organize. Each storage system unit allows for the storage of a plurality of items. Any number of storage system units can be installed side by side. The spacing between each unit is at the users discretion thereby offering the user a broad range of options in terms of items to be stored and the amount of space used for storage.

DRAWINGS

Figures

FIG. 5 is a top view of the slide arm.

FIG. 6 is a side view of the slide arm.

FIG. 7 is rear view of the slide arm.

FIG. 8 is a side view of the part of my invention which will be referred to as the hanger in all future references to this piece of the invention.

FIG. 9 is a bottom view of the hanger.

DRAWINGS

Reference Numerals

20—Double sided adhesive strip
22—Bracket top
24—Bracket screw holes
26—Top section of the slide arm
28—Extended center section of the slide arm
29—Slide arm pull
30—Hook
32—Bracket side wall
34—Bracket lip
36—Bracket stop
38—Hanger eye
40—Hanger stem
42—Hanger base
44—Hanger adhesive disc
46—Protective paper disc

DETAILED DESCRIPTION

Preferred Embodiment (All Figures)

Figure 1:
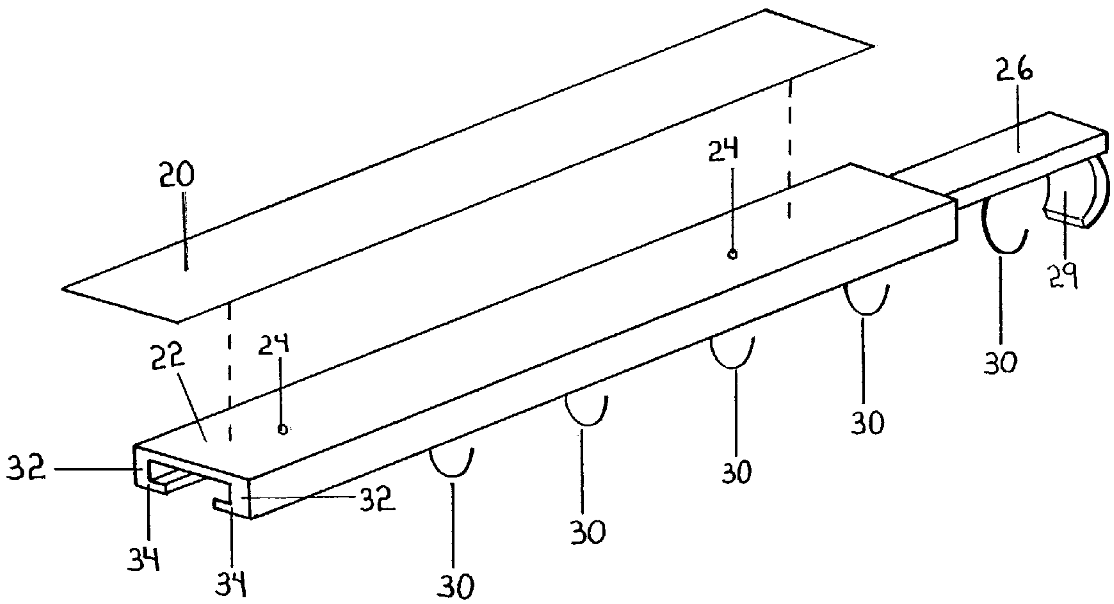
FIG. 1 is a perspective drawing of my invention.
Figure 2:
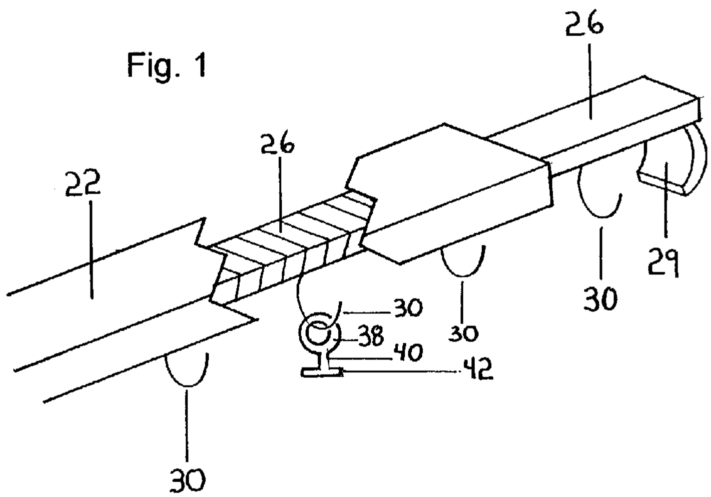
FIG. 2 is a cut away view of my invention.
Figure 3:
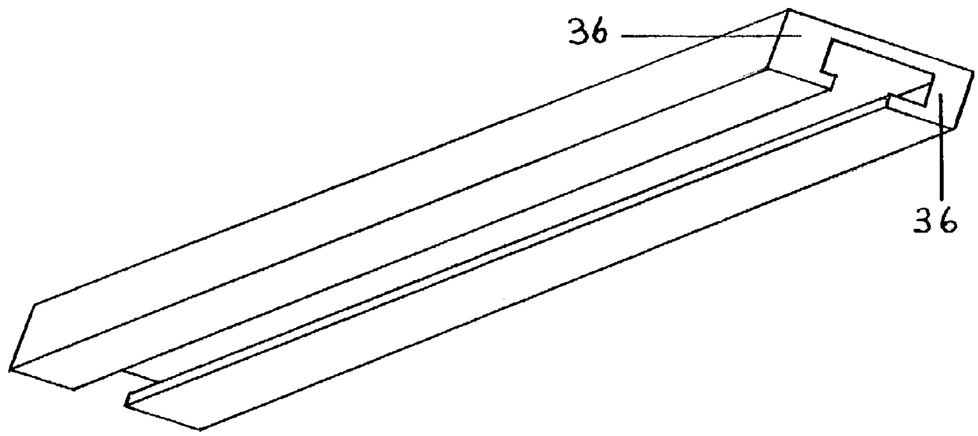
FIG. 3 is the part of my invention that will be referred to as the bracket in all future references to this piece of the invention.
Figure 4:
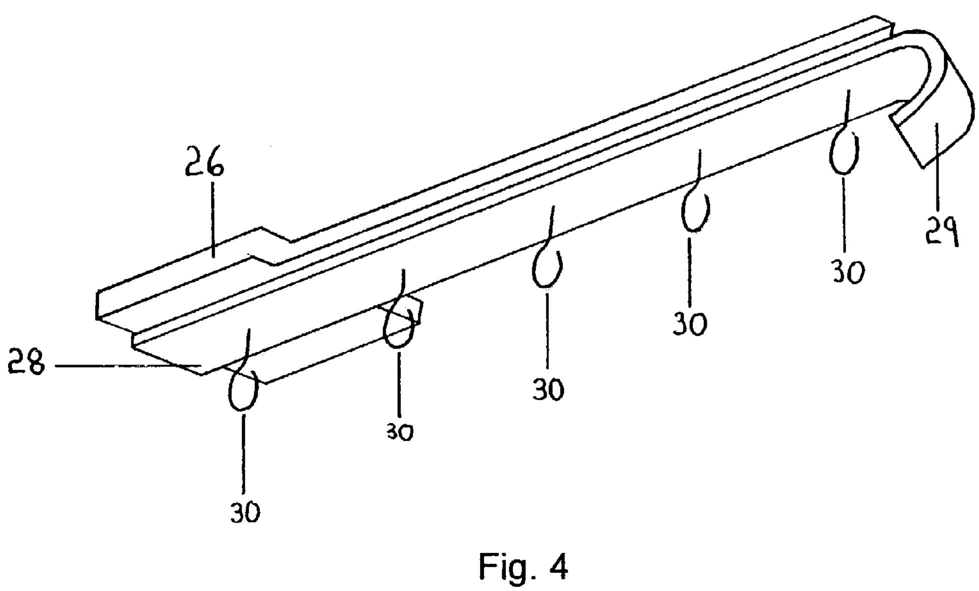
FIG. 4 is the part of my invention that will be referred to as the slide arm in all future references to this piece of the invention.

A preferred embodiment of the present invention, which in future will be referred to as the storage system, is illustrated in FIG. 1 (side perspective view) and FIG. 2 (cut away view). The storage system is composed of three parts, being a bracket FIG. 3, a slide arm FIG. 4 and a hanger FIG. 8. In the preferred embodiment the bracket FIG. 3 and slide arm FIG. 4 are manufactured as separate molded plastic objects. However, the storage system can be constructed of wood, metal or any suitable alternate material. The external measurements of the bracket FIG. 3 are 41 mm wide, 255 mm long and 10 mm high. A double-sided adhesive strip 20 measuring 41 mm wide and 255 mm long is offered as one means of installation. The bracket top 22 includes two screw holes 24 to offer an alternate method of installation. One screw hole 24 is placed 30 mm from the back end of the bracket FIG. 3 and the other screw hole 24 is placed 60 mm from the front end of the bracket FIG. 3. The screw holes 24 are beveled on the underside of the bracket top 22 to allow for insertion of a flat headed screw which becomes flush with the inside surface of the bracket top 22 when in place.

The internal configuration of the bracket FIG. 3 provides for a side wall 32 (FIG. 7) measuring 5.5 mm wide, 249 mm long and 5 mm high from the inside of the bracket top 22 to the inside top of the bracket lip 34. At the front end of the bracket FIG. 3 the side wall 32 is extended to form a bracket stop 36 that measures 9mm wide, 6 mm long and 5 mm high. This provides a mechanism to insure that the slide arm FIG. 4 does not exit the bracket FIG. 3 when the slide arm FIG. 4 is fully extended. The configuration of the bracket FIG. 3 provides for a bracket lip 34 measuring 13 mm wide, 255 mm long and 3 mm high. The bracket lip 34 supports the slide arm FIG. 4 in the bracket FIG. 3. The side wall 32, combined with the bracket lip 34, provides a track for the slide arm FIG. 4.

The second piece of the storage system is a slide arm FIG. 4, which is a molded plastic item that includes an extended center section 28 that extends from the top section of the slide arm 26 (FIG. 7 —rear view of slide arm) and includes 5 hooks 30 and a slide arm pull 29. The top section of the slide arm 26 (FIG. 5) is 4.5 mm thick and 255 mm long. At the back end, the top section of the slide arm 26 measures 29 mm across and 50 mm long. The remaining 205 mm length of the top of the slide arm 26 measures 22.5 mm wide.

The extended center section of the slide arm 28 is 14 mm wide and 3 mm thick. The length of the extended center section of the slide arm 28 is straight for 255 mm and then extends past the end of the top section of the slide arm 26 into a half circle slide arm pull 29 (FIG. 6) with an internal diameter of 15 mm and a thickness of 4 mm. There are 5 hooks 30 that extend from the bottom side of the extended center section of the slide arm 28. Starting toward the back of the slide arm FIG. 6 the first hook 30 is placed 26 mm from the back end of the slide arm FIG. 4. Each additional hook is placed at 50 mm intervals down the length of the slide arm. The hooks 30 extend 20 mm down from the bottom surface of the extended center section of the slide arm 28.

The companion pieces to the storage system are hangers FIG. 9. Each hanger FIG. 9 is manufactured as a molded plastic object but could be made from a suitable alternate material. The hanger FIG. 9 is composed of a hanger eye 38 with an interior diameter of 9 mm and an external diameter of 13 mm. The hanger eye 38 is composed of a cylinder with a 2 mm diameter. A cylindrical stem 40 with a diameter of 2 mm extends 4 mm from the hanger eye 38. The hanger stem 40 connects the hanger eye 38 with a hanger base 42. The hanger stem 40 is positioned at the center of the hanger base 42. The hanger base 42 is a circle with a 15 mm diameter and thickness of 2 mm. A double stick adhesive disc 44 with a 15 mm diameter is affixed to the bottom of the hanger base 42. A protective paper disc 46 with a 15 mm diameter covers the bottom side of the adhesive disc 44.

OPERATION OF INVENTION

The storage system unit described in this patent application is assembled prior to installation by inserting the slide arm FIG. 4 into the bracket FIG. 3. The slide pull 29 at the front end of the slide arm FIG. 4 is inserted into the rear end of the bracket FIG. 3 with the top section of the slide arm 26 facing toward the bracket top 22 and then pulled toward the bracket stop 36.

Subsequent to assembly, the storage system unit is installed for use by affixing it to the underside of a shelf, cabinet or other horizontal mounting structure. The storage system unit is suitable for use in either open shelving or a closed cabinet. The bracket FIG. 3 is attached to the underside of a horizontal mounting structure using one of two installation options. One option is to screw the storage system unit into the underside of the horizontal mounting structure by inserting flat head screws through the bracket screw holes 24 into the underside of the horizontal mounting structure. If this method of installation is chosen, the slide arm FIG. 4 must be pulled to its full forward position during installation. The other option is to affix the double stick adhesive strip 20 to the bracket top 22 and then install the storage system unit under the horizontal mounting structure using the adhesive strip 20 to hold it in place. In either case, the storage system unit is installed with the slide arm pull 29 at the front edge of the horizontal mounting structure.

Once the storage system unit has been assembled and installed, it operates by using the slide arm pull 29 to bring the slide arm FIG. 4 forward when reaching for a stored item and pushing the slide arm FIG. 4 back when the storage system unit is not in use.

The items to be stored using the storage system unit are hung from the hooks 30 which are built into the extended center section of the slide arm 28.

The hangers FIG. 9 are attached to the tops of receptacles which are to be stored using the storage system unit by the use of an adhesive disc 44. This adhesive disc 44 is protected by a layer of paper 46 which is kept in place until such time as the hanger FIG. 9 is attached to the object to be stored. When ready to attach the hanger FIG. 9 to the item to be stored, the user removes the protective paper layer 46 from the adhesive disc 44 and presses the disc onto the top of the receptacle. Alternately, any receptacle that has a hole at its top can be hung from the storage hooks 30. For example, a standard plastic storage bag with a pressure closure that has a half-inch of plastic extending above the closure can have a hole punched into it so that it can be hung from the hook 30. Similarly, any item such as a kitchen utensil incorporating a suitable feature can be hung from a hook 30.

ADVANTAGES

The Retractable System for Hanging Storage provides many advantages for storing small items.

a) Items can be stored in the top section of a shelf or cupboard using space that is frequently wasted.

b) The slide arm of the storage system can be pulled forward providing ease of access to items stored at the back of a storage area.

c) The storage system units can be installed in any configuration suitable to the width of items that require storage.

d) One or more storage system units can be installed pursuant to available space.

e) The storage system unit provides an installation option that does not require use of tools.

f) The hooks on the slide arm allow for ease of removal and replacement of items being stored.

g) The hooks on the slide arm allow for storage of any item that can be hung from a hook.

h) The hangers make it easy to adapt any flat top container of suitable dimension for use as a receptacle in the storage system unit.

CONCLUSIONS, RAMIFICATIONS AND SCOPE

As is evident, the Retractable System for Hanging Storage has many advantages over existing methods for storing small items. The storage allows efficient use of space which is otherwise frequently wasted. The storage system allows easy access to items stored toward the back of a shelf or cupboard. In addition, the storage system allows flexibility in terms of the volume of storage required and the amount of space available for storage. The items stored using the retractable storage system can be organized in any way that appeals to the user, such as by alphabetical order (as in the case of spices) or by item type. The storage system can be installed without the use of any tools. The hangers developed for use with the storage system allow standard flat top containers to be easily adapted for hanging storage. In addition, any item that has a hole, loop or lip can be hung from a hook for storage. Items that are hung from the storage system are easily removed and replaced.

Although the description above contains much specificity, this should not be construed as limiting the scope of the invention but as merely providing illustrations of some of the presently preferred embodiments of this invention. A similar mechanism made with a bracket with multiple tracks could support a plurality of slide arms. A similar mechanism made in a larger size could allow for a greater plurality of hooks and/or receptacles of larger depth. In addition to receptacles, other items such as cooking utensils can be stored and organized using the storage system. A similar mechanism made in a larger scale could be used for storage of larger items such as gardening tools or mops and brooms. Accordingly, the scope of the invention should be determined not by the embodiment illustrated, but by the appended claims and their legal equivalents.

What is claimed is:

1. A retractable storage system that attaches to the underside of a horizontal surface, the system comprising:

a) a bracket comprised of a top, sides and two bottom lips, with each lip extending from a respective side, thereby providing a track therebetween the top, sides and lips;

b) a slide arm having a plurality of hooks extending from an underside of said slide arm, whereby the slide arm is mounted in the track of said bracket and includes a half circle slide arm pull at a forward end thereof, said slide arm pull providing means for pulling said slide arm forward from within said track to reach said hooks toward the rear of said slide arm;

c) a plurality of hangers, each comprised of a hanger eye, a hanger stem, a hanger base having a substantially planar bottom surface that is wider than said hanger stem, and an adhesive disc covering said bottom surface of said hanger base, whereby the hanger eyes of said hangers are suspended from said hooks; and d) the adhesive disc of each of said hangers providing means for attaching containers to said hangers allowing said containers to be suspended from said hooks during storage, whereby when the hangers are suspended from the hooks, the bottom surfaces of said hanger bases lie in a plane substantially parallel to the underside of said slide arm.

* * * * *